US010604431B2

(12) United States Patent
Leen et al.

(10) Patent No.: US 10,604,431 B2
(45) Date of Patent: Mar. 31, 2020

(54) METHOD TO DISPERSE BYPRODUCTS FORMED IN DILUTION STEAM SYSTEMS

(71) Applicants: Ecolab USA Inc., St. Paul, MN (US); SABIC Global Technologies B.V., Bergen op Zoom (NL)

(72) Inventors: Steven Leen, Bree (BE); Fabrice Cuoq, Beverwijk (NL); Anthoni van Zijl, Eindhoven (NL); Jerome Vachon, Maastricht (NL); Russell P. Watson, Idaho Falls, ID (US); Theodore C. Arnst, Sugar Land, TX (US); Javier Florencio, Reus (ES); Bhaskar R. Aluri, Hyderabad (IN)

(73) Assignee: Ecolab USA Inc., St. Paul, MN (US)

( * ) Notice: Subject to any disclaimer, the term of this patent is extended or adjusted under 35 U.S.C. 154(b) by 335 days.

(21) Appl. No.: 15/390,987

(22) Filed: Dec. 27, 2016

(65) Prior Publication Data
US 2017/0183248 A1 Jun. 29, 2017

Related U.S. Application Data

(60) Provisional application No. 62/271,667, filed on Dec. 28, 2015.

(51) Int. Cl.
*C02F 5/10* (2006.01)
*C02F 5/12* (2006.01)
*C02F 103/36* (2006.01)

(52) U.S. Cl.
CPC .................. *C02F 5/10* (2013.01); *C02F 5/12* (2013.01); *C02F 2103/365* (2013.01)

(58) Field of Classification Search
CPC ....................................................... C02F 5/10
See application file for complete search history.

(56) References Cited

U.S. PATENT DOCUMENTS 3,567,623 A 3/1971 Hagney
4,105,540 A 8/1978 Weinland
(Continued)

FOREIGN PATENT DOCUMENTS

CN 1923350 A 3/2007
CN 101838058 A 9/2010

OTHER PUBLICATIONS

International Search Report dated Apr. 25, 2017 for International Application No. PCT/US2016/068637, 4 pages.
(Continued)

*Primary Examiner* — Peter Keyworth
(74) *Attorney, Agent, or Firm* — Kagan Binder, PLLC

(57) ABSTRACT

Disclosed herein are methods for reducing fouling caused by process water present within a water recycling loop of a pyrolysis plant. The process water includes water, a pygas, and in some cases pygas byproducts. Fouling is caused by phase separation and accumulation of materials from the process water on equipment surfaces. The method includes applying a total of about 5 ppm to 500 ppm of one or more antifouling polymers to the process water to form a treated process water. The one or more antifouling polymers are selected from the group consisting of copolymers of unsaturated fatty acids, primary diamines, and acrylic acid; copolymers of methacrylamidopropyl trimethylammonium chloride with acrylic acid and/or acrylamide; copolymers of ethylene glycol and propylene glycol; and blends of two or more thereof.

19 Claims, 2 Drawing Sheets

(56) References Cited

U.S. PATENT DOCUMENTS

| | | | |
|---|---|---|---|
| 4,160,742 | A | 7/1979 | Raman |
| 4,460,477 | A | 7/1984 | Costello et al. |
| 5,294,347 | A | 3/1994 | Byrne et al. |
| 5,420,194 | A | 5/1995 | Rowe et al. |
| 5,427,690 | A | 6/1995 | Rowe et al. |
| 5,445,743 | A | 8/1995 | Rowe et al. |
| 5,851,377 | A | 12/1998 | Bush |
| 8,728,324 | B2 | 5/2014 | Meskers, Jr. et al. |
| 2002/0153310 | A1* | 10/2002 | Kurukchi ............ B01D 3/38 210/634 |
| 2005/0139807 | A1 | 6/2005 | Tong |
| 2005/0263437 | A1 | 12/2005 | Howdeshell |
| 2010/0004152 | A1 | 1/2010 | Karagianni et al. |
| 2013/0310616 | A1* | 11/2013 | Neumann ......... B01D 17/0208 585/264 |
| 2015/0136660 | A1 | 5/2015 | Bedard et al. |
| 2015/0218468 | A1 | 8/2015 | Ovaskainen et al. |
| 2015/0259231 | A1* | 9/2015 | Webber ................. C02F 1/66 210/706 |
| 2017/0145222 | A1* | 5/2017 | Zha ....................... C02F 5/12 |

OTHER PUBLICATIONS

PCT Written Opinion dated Apr. 25, 2017 for International Application No. PCT/US2016/068637, 3 pages.

Examination Report in Gulf Cooperation Council (GCC) Patent Application No. GC 2016-32675, dated Jan. 28, 2019, 4 pages.

Communication pursuant to Rule 164(1) EPC with Partial Supplementary European Search Report, European Application No. 16882486.0, dated Jan. 17, 2020, 18 pages.

Chinese Office Action & Search Report mailed in Chinese Application No. 201680076472.2, dated Dec. 9, 2019, 13 pages (7 pages English Translation & 6 pages Official Copy).

* cited by examiner

METHOD TO DISPERSE BYPRODUCTS FORMED IN DILUTION STEAM SYSTEMS

TECHNICAL FIELD

The invention is directed to the use of polymeric dispersants in the dilution steam systems of ethylene-producing plants, such as steam crackers.

BACKGROUND

In the production of petrochemicals, water is often used to control various chemical reactions, for example by transferring heat from process streams to quench reactions. When such water is subjected to intimate contact with a process stream, it is commonly referred to as process water. In ethylene manufacturing plants, steam is contacted with the process feedstock to control the pyrolysis (cracking) process by lowering the partial pressure of the hydrocarbon feedstock, improving the efficiency of the conversion reaction. Downstream of the pyrolysis reactors, a water quench tower is further employed to cool the gas leaving a primary fractionator or a transfer line exchanger.

In pyrolysis processes including ethylene production processes, the "Dilution Steam System" (DSS) typically consists of a series of fluidly connected devices including a quench water tower, an oil/water separator, a process water stripper, and a dilution steam generator. Together, the DSS devices in fluid connection represent a water recycling loop. Steam from the dilution steam generator is sent to the pyrolysis furnace and is recovered as water in the quench tower. Temperatures at the base of the quench water tower can approach 100° C., for example about 60° C. to 100° C., or about 80° C. to 90° C.

The water recycling loop can experience a variety of problems due to conditions and compounds present in the quench water tower. Significant quantities of pygas, pytar and various other contaminants formed as a result of the pyrolysis process can concentrate in the process water of the quench water tower. If unchecked, these contaminants can lead to fouling of equipment, that is, deposition on interior surfaces of the dilution steam system. Lack of effective gasoline/water separation in a quench water tower (QWT) or quench water settler (QWS) leads to pygas, pytar, and reacted or reactive byproducts of these circulating through the DSS. Fouling potential is due to the presence of reactive species such as polymerizable compounds present in the pygas or pygas/pytar, heat removal by "pumparounds", and a mixture of hydrogen, steam, and generally harsh conditions present during operation of the water recycling loop. For example, in some cases these contaminants or reacted byproducts thereof accumulate on heat exchange surfaces or even proceed into the boiler, where it must be separated from the recyclable water and disposed of as "blowdown". In some embodiments, as much as 5%-10% of total water volume in the system is blown down. Since blowdown water is also employed to preheat incoming water within the recycling loop, the blowdown water is cooled and this in turn can result in additional precipitation and accumulation of solids on device surfaces.

Byproducts associated with fouling include oligomers and polymers including the residues of one or more styrenes, indene, isoprene, and the like as well as co-oligomers and co-polymers incorporating residues of a variety of other polymerizable compounds present in pygas. Byproducts associated with fouling further include polynuclear aromatic compounds (also known as polycyclic aromatics) such as tars, coke, and coke-like materials arising from chemical reactions of other species present within the dilution steam system.

Due to the presence of pygas within the quench water tower (QWT) or quench water settler (QWS) of such pyrolysis plants, coupled with harsh conditions including high temperatures, byproducts form and can subsequently be carried along with the process water to the process water stripper (PWS). By way of example, capturing styrene in the quench water tower exacerbates fouling by providing conditions favorable for its polymerization, leading eventually to deposition of the styrenic products on equipment surfaces. This causes fouling not only at the bottom of the PWS, but also at the dilution steam generator (DSG) preheaters. This in turn leads to poor energy efficiency and in worse cases, to plant shutdowns due to cumulative fouling. The DSG also fouls due to byproduct carry-over, and the QWT may suffer fouling as well. For plants employing feed saturators in lieu of dilution steam generators, analogous fouling and deleterious results also occur.

Thus, there is a need in the industry to reduce fouling within the dilution steam systems of ethylene-producing or other pyrolysis plants. Less fouling improves the energy efficiency of the system, prevents plant throughput reduction, and prevents product quality issues in the process water due to the use of recycled process water as quench water.

SUMMARY

Disclosed herein is a method of reducing fouling caused by process water comprising water and a pygas present within a water recycling loop of an industrial process, the method comprising applying a total of about 5 ppm to 500 ppm of one or more antifouling polymers to the process water to form a treated process water, the one or more antifouling polymers are selected from the group consisting of copolymers of unsaturated fatty acids, primary diamines, and acrylic acid; copolymers of methacrylamidopropyl trimethylammonium chloride with acrylic acid and/or acrylamide; copolymers of ethylene glycol and propylene glycol; and blends of two or more thereof; and contacting the treated process water with an interior surface within the water recycling loop.

In some embodiments the one or more antifouling polymers are selected from the group consisting of copolymers of unsaturated fatty acids, primary diamines, and acrylic acid; and copolymers of methacrylamidopropyl trimethylammonium chloride with acrylamide. In some such embodiments the one or more antifouling polymers are applied at a ratio of about 25:75 to 75:25 by weight of the copolymer of tall oil fatty acid, diethylenetriamine, and acrylic acid to the copolymer of methacrylamidopropyl trimethylammonium chloride with acrylamide. In some such embodiments the antifouling polymers are applied to the process water at a total concentration of about 10 ppm to 1000 ppm.

In some embodiments the copolymers of unsaturated fatty acids, primary diamines, and acrylic acid comprise at least about 50 wt % tall oil fatty acid. In some embodiments the copolymers of unsaturated fatty acid, diamine, and acrylic acid comprise diethylenetriamine. In some embodiments the antifouling polymer comprises, consists essentially of, or consists of a copolymer having 50 wt % to 90 wt % tall oil fatty acid content, 5 wt % to 40 wt % diethylenetriamine content, and 5 wt % to 35 wt % acrylic acid content based on the weight of the polymer.

In some embodiments the industrial process is pyrolysis, and the water recycling loop is present within a pyrolysis plant. In some embodiments the applying is downstream from a coalescer in the pyrolysis plant. In some embodiments the applying is carried out continuously. In some embodiments during the applying the process water is present at a temperature of about 60° C. to 110° C. In some embodiments the process water further comprises pygas byproducts.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1:
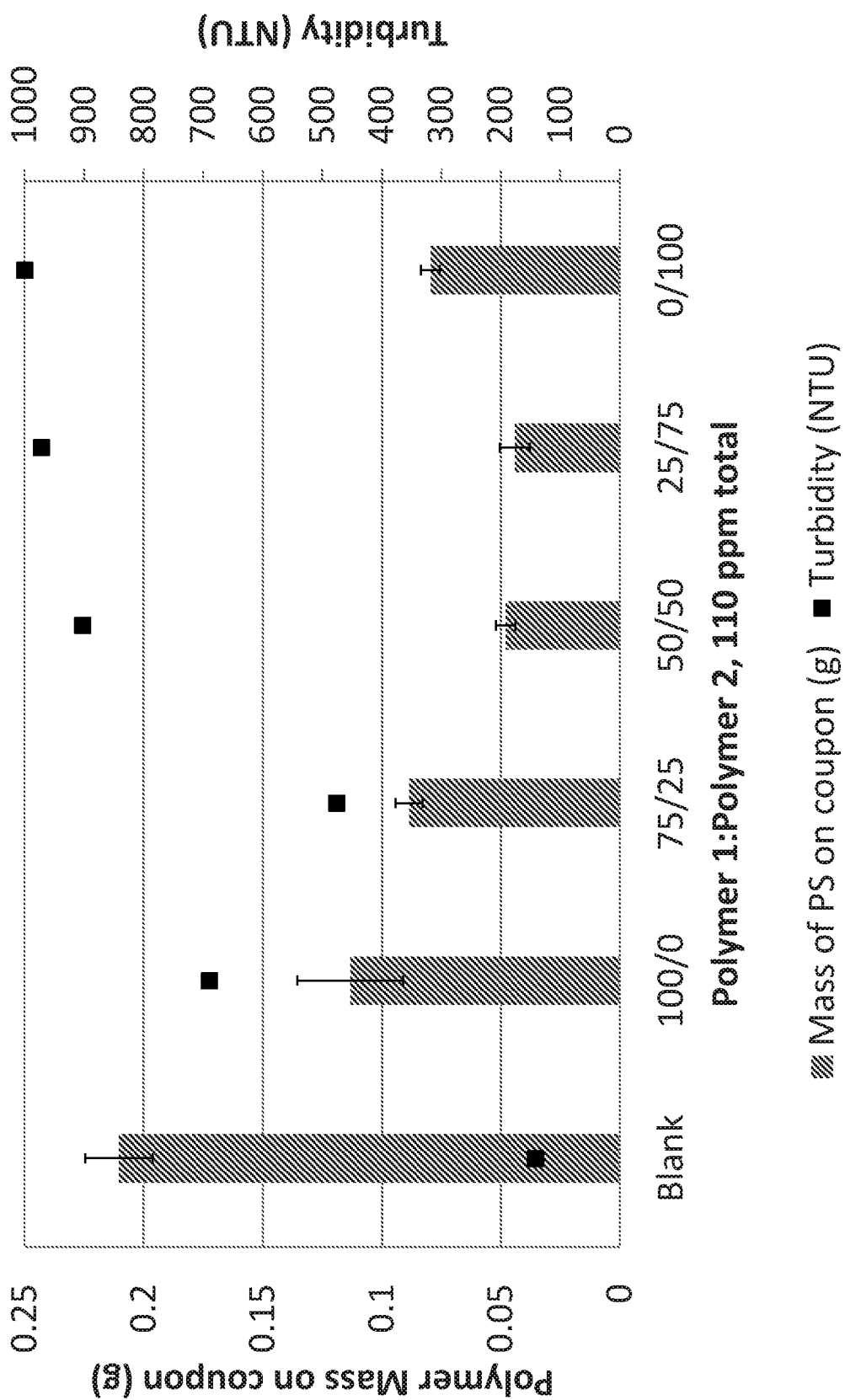
FIG. 1 is a plot showing mass of polystyrene deposition and turbidity for Examples 4-9C.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

As used herein, the term "pyrolysis byproduct" means pygas, pytar, another material, or combination of two or more thereof formed as a byproduct of a pyrolysis procedure.

As used herein, the term "pygas" is a term of art and shorthand for "pyrolysis gasoline". Pygas is a pyrolysis byproduct that is less dense than water and is a mixture of petroleum based products that condenses along with water in the quench water tower of a dilution steam system of an industrial processing plant, such as a pyrolysis plant. Pygas is a variable mixture of hydrocarbons and other byproducts, wherein the mixture components and amounts are determined by the feedstock and conditions employed in the pyrolysis. As determined by context and/or unless otherwise specified, pygas includes one or more aromatic compounds and a mixture of alkanes and alkenes having at least 5 carbons, wherein a majority (i.e. more than 50 wt %) of the alkane/alkene component is $C_5$-$C_{12}$. In some embodiments, pygas is rich in benzene (for example, 20 wt %-45 wt %). In some embodiments pygas contains appreciable quantities of highly reactive olefins and diolefins such as styrene, isoprene, piperylenes, cyclopentadienes, and combinations thereof. In some embodiments pygas further includes components such as $C_1$-$C_5$ organic acids. In some embodiments, pygas includes about 0.01 wt % to as much as about 20 wt % pytar based on the total weight of a pygas-pytar mixture, where the amount of pytar depends on the individual equipment employed for cracking and the feedstock.

Unless otherwise specified, or in context, "pygas" includes both pygas and pygas-pytar mixtures. In pygas-pytar mixtures, a pytar is co-dissolved or co-dispersed within a pygas or a pygas mixture with quench water, resulting in a highly variable density and viscosity profile of such mixtures.

As used herein, the term "pytar" is a term of art and shorthand for "pyrolysis tar". Pytar is a pyrolysis byproduct that is denser than water and is a mixture of petroleum based products that condenses along with water in the quench water tower of a dilution steam system of a pyrolysis plant. The term indicates a mixture of >$C_{12}$ alkanes/alkenes and/or ≥C10 polyaromatic hydrocarbons including, for example, anthracene, phenanthrene, pyrene, chrysene, fluoranthene, and others as well as mixtures of two or more thereof and with similar compounds along with variants that have a random distribution of substituents such as methyl, ethyl, and higher alkyl or alkenyl substituents.

As used herein, the term "pygas byproduct" means any one or more compounds formed as the product of a chemical reaction of one or more components of pygas (including pygas/pytar mixtures) wherein the reaction takes place within a dilution steam system of a pyrolysis plant, further wherein the reaction results in an increase in molecular weight of one or more of the reacted components. In some embodiments, a pygas byproduct includes an oligomerized or polymerized residue of styrene and/or one or more unsaturated and radically polymerizable components of the pygas. The term is not limited as to degree of polymerization; in various embodiments, pygas byproducts include dimers, trimers, and the like as well as higher oligomers and polymers. The term "pygas byproducts" also includes polynuclear aromatic compounds, "tar", "coke" and other byproducts that are the reaction product of e.g. pytar components or components present in a mixture of pygas and pytar.

As used herein, the term "fouling" means phase separation of pygas components or pygas byproducts from a process water. In some embodiments, fouling is further coupled with measurable accumulation of pygas components or pygas byproducts on one or more solid interior surfaces of a device, wherein the device is disposed in fluid connection within a dilution steam system. "Measurable" in this context means the accumulation is visible or quantifiable by weighing or using one or more analytical methods. "Interior" in this context means a solid surface in fluid contact with at least a process water during operation of a water recycling loop of an industrial processing plant.

As used herein, the chemical names of polymerizable species (such as, e.g. acrylic acid, styrene, and the like) are used to mean either the chemical species itself or the polymerized residue thereof in one or more polymers, as determined by context.

As used herein, the term "molecular weight" as applied to a polymer means weight-average molecular weight, unless otherwise indicated or as determined by context. Where a commercially obtained polymer is disclosed, molecular weight is reported as disclosed by the seller.

Unless specifically indicated otherwise, any carboxylate groups present within any polymer described herein are intended to indicate the free carboxylic acid, a conjugate base thereof (carboxylate), or a combination of both as residues within a single polymer. Conjugate bases are not limited as to the counterion present and associated therewith. In some embodiments, the counterion is sodium but in other embodiments is another mono- or divalent cation. Examples of suitable counterions include ammonium, alkylammonium, lithium, potassium, calcium, zinc, and the like, or a combination of two or more thereof as selected by the user for use in one or more applications as described herein.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe any range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Disclosed herein are methods of preventing or reducing fouling due to pygas and/or pygas byproducts present within a water recycling loop of an industrial processing system. In some embodiments the processing system is a pyrolysis plant. In some embodiments, the pyrolysis plant is an ethylene manufacturing plant. In some embodiments, the water recycling loop is provided by operation of a dilution steam system within a pyrolysis plant. The methods include applying one or more antifouling polymers to a water recycling loop within an industrial processing system. Disclosed herein are methods of reducing fouling in a water recycling loop of an industrial process comprising process water containing pygas or pygas byproducts, wherein the methods include applying one or more antifouling polymers to the process water to form a treated process water, and contacting the treated process water with an interior surface within the water recycling loop. The methods are effective to reduce or prevent fouling of the contacted surfaces.

In some embodiments, the antifouling polymers are applied to a device disposed in fluid connection within the water recycling loop, wherein the device comprises, consists essentially of, or consists of a quench water tower (QWT), a quench water settler (QWS), a process water stripper (PWS), a dilution steam generator (DSG), a feed saturator (FS), or two or more thereof. Each such device is fluidly connected to one or more other devices in a manner that facilitates recycling of the water within the water recycling loop. Where such devices are present as part of the water recycling loop of a pyrolysis plant, each such device is fluidly contacted within the interior thereof by one or more mixtures of process water, pygas, and pygas byproducts.

In some embodiments, pygas includes about 0.01 wt % to as much as about 20 wt % pytar, where the pytar amount depends on the individual equipment employed to carry out pyrolysis and the feedstock. In some such embodiments, the feedstock of an ethylene manufacturing plant comprises, consists essentially of, or consists of naphtha, ethane, propane, butane, or a combination thereof. In embodiments, the pygas in the emulsion includes about 0.05 wt % to 20 wt % pytar, or about 0.1 wt % to 20 wt %, or about 0.5 wt % to 20 wt %, or about 1 wt % to 20 wt %, or about 0.01 wt % to 15 wt %, or about 0.01 wt % to 10 wt %, or about 0.01 wt % to 5 wt %, or about 0.01 wt % to 3 wt %, or about 0.01 wt % to 1 wt %, or about 0.1 wt % to 3 wt % pytar based on the weight of the pygas in the pygas emulsion. The methods of the invention are suitable to address the full range of pygas-pytar ratios known by those of skill in addition to addressing the pygas byproducts that also form from such mixtures within the water recycling loop.

According to the methods of the invention, an effective amount of one or more antifouling polymers are applied to a water recycling loop of an industrial processing system. In some embodiments the industrial processing system is a pyrolysis plant. In some embodiments, a solution or dispersion of the antifouling polymers is formed initially, then the solution or dispersion is applied to process water present within a device disposed in fluid connection within the water recycling loop. Since the antifouling polymers are fully water soluble or dispersible, such solutions are easily made and applied to the device by mixing with the process water present in the device. The presence of the one or more antifouling polymers prevents or reduces the amount of fouling of surfaces contacting the process water within the water recycling loop.

Antifouling Polymers.

Three distinct polymeric structures are employed as antifouling polymers in the methods of the invention. As will be discussed in more detail, the polymers are usefully applied to a water recycling loop individually or in combination to result in antifouling properties within the recycling loop. Collectively, the three polymers individually or in combinations of two or more thereof are referred to collectively herein as "antifouling polymers." The three polymers are as follows and are referred to herein as Polymer 1, Polymer 2, and Polymer 3.

Polymer 1: comprises, consists essentially of, or consists of copolymers of unsaturated fatty acids, primary diamines, and acrylic acid. The unsaturated fatty acids comprise mono- or polyunsaturated long-chain acids derived from sources comprising, consisting essentially of, or consisting of tall oil (tall oil fatty acids, or TOFA), coconut oil, canola oil, palm seed oil, and the like. TOFA is obtained by fractional distillation and other purification processes carried out on tall oil. Tall oil, or tallol, is obtained as a by-product of the Kraft process of wood pulp manufacture, principally from pulping coniferous trees. Crude tall oil contains rosins, fatty acids and fatty alcohols, sterols, and other alkyl hydrocarbon derivatives. The majority component of TOFA (i.e. after purification of crude tall oil) is oleic acid. The primary diamines comprise, consist essentially of, or consist of compounds having at least two primary amine groups and include polyamines such as diethylenetriamine (DETA), triethylenetetraamine (TETA), tetraethylenepentamine (TEPA), and other such compounds.

In embodiments, the amount of unsaturated fatty acid in Polymer 1 is about 50 wt % to 90 wt % of the weight of Polymer 1, or about 60 wt % to 90 wt %, or about 70 wt % to 90 wt %, or about 50 wt % to 85 wt %, or about 50 wt % to 80 wt %, or about 50 wt % to 75 wt %, or about 60 wt % to 85 wt %, or about 70 wt % to 80 wt % of weight of Polymer 1. In embodiments, the weight of primary diamine in Polymer 1 is about 5 wt % to 40 wt % of the weight of Polymer 1, or about 5 wt % to 35 wt %, or about 5 wt % to 30 wt %, or about 5 wt % to 25 wt %, or about 5 wt % to 20 wt %, or about 5 wt % to 40 wt %, or about 7 wt % to 40 wt %, or about 10 wt % to 40 wt %, or about 15 wt % to 40 wt %, or about 10 wt % to 30 wt %, or about 10 wt % to 25 wt %, or about 10 wt % to 20 wt %, or about 10 wt % to 15 wt % of the weight of Polymer 1. In embodiments, the weight of acrylic acid in Polymer 1 is about 5 wt % to 35 wt % of the weight of Polymer 1, or about 5 wt % to 30 wt %, or about 5 wt % to 25 wt %, or about 5 wt % to 20 wt %, or about 5 wt % to 15 wt %, or about 7 wt % to 25 wt %, or about 10 wt % to 25 wt %, or about 12 wt % to 25 wt %, or about 15 wt % to 25 wt %, or about 10 wt % to 20 wt %, or about 12 wt % to 20 wt %, or about 10 wt % to 15 wt % of the weight of Polymer 1.

In embodiments, the weight-average molecular weight of Polymer 1 ranges from about 200 g/mol to 20,000, g/mol, for example about 300 g/mol to 20,000 g/mol, or about 400 g/mol to 20,000 g/mol, or about 500 g/mol to 20,000 g/mol, or about 600 g/mol to 20,000 g/mol, or about 700 g/mol to 20,000 g/mol, or about 800 g/mol to 20,000 g/mol, or about 900 g/mol to 20,000 g/mol, or about 1000 g/mol to 20,000 g/mol, or about 200 g/mol to 15,000 g/mol, or about 200 g/mol to 10,000 g/mol, or about 200 g/mol to 9,000 g/mol, or about 200 g/mol to 8,000 g/mol, or about 200 g/mol to 7,000 g/mol, or about 200 g/mol to 6,000 g/mol, or about 200 g/mol to 5,000 g/mol, or about 200 g/mol to 4,000 g/mol, or about 200 g/mol to 3,000 g/mol, or about 200 g/mol to 2,000 g/mol, or about 200 g/mol to 1000 g/mol, or about 300 g/mol to 5,000 g/mol, or about 400 g/mol to 2500 g/mol, or about 500 g/mol to 1000 g/mol. In one representative embodiment, Polymer 1 is a copolymer of tall oil fatty acid, diethylene triamine and acrylic acid at a molar ratio of 2.1:1.0:1.1 (TOFA:DETA:AA).

Polymer 2: copolymers of acrylic acid (AA) and/or acrylamide (AM) with methacrylamidopropyl trimethylammonium chloride (MAPTAC). The AM/MAPTAC copolymers are assigned CAS No. 58627-30-8. In embodiments, the molar ratio of AA to AM in Polymer 2 is 0:1 to 1:0 and the AA/AM is copolymerized with MAPTAC at a molar ratio of about 10:90 to 99:1 AA/AM:MAPTAC. In one representative example, Polymer 2 comprises, consists essentially of, or consists of 45 mole % AA, 10 mole % AM, 45 mole % MAPTAC. In another representative example, Polymer comprises, consists essentially of, or consists of about 97.5 wt % AM and 2.5% MAPTAC.

In embodiments, the average molecular weight of Polymer 2 is about 50,000 g/mol to 3,000,000 g/mol, for example about 100,000 g/mol to 3,000,000 g/mol, or about 200,000 g/mol to 3,000,000 g/mol, or about 300,000 g/mol to 3,000,000 g/mol, or about 400,000 g/mol to 3,000,000 g/mol, or about 500,000 g/mol to 3,000,000 g/mol, or about 600,000 g/mol to 3,000,000 g/mol, or about 700,000 g/mol to 3,000,000 g/mol, or about 800,000 g/mol to 3,000,000 g/mol, or about 900,000 g/mol to 3,000,000 g/mol, or about 1,000,000 g/mol to 3,000,000 g/mol, or about 50,000 g/mol to 2,500,000 g/mol, or about 50,000 g/mol to 2,000,000 g/mol, or about 50,000 g/mol to 1,900,000 g/mol, or about 50,000 g/mol to 1,800,000 g/mol, or about 50,000 g/mol to 1,700,000 g/mol, or about 50,000 g/mol to 1,600,000 g/mol, or about 50,000 g/mol to 1,500,000 g/mol, or about 50,000 g/mol to 1,400,000 g/mol, or about 50,000 g/mol to 1,300,000 g/mol, or about 50,000 g/mol to 1,200,000 g/mol, or about 50,000 g/mol to 1,100,000 g/mol, or about 50,000 g/mol to 1,000,000 g/mol, or about 500,000 g/mol to 2,000,000 g/mol, or about 500,000 g/mol to 1,500,000 g/mol, or about 800,000 g/mol to 1,200,000 g/mol. In embodiments, the molecular weight is measured for Polymer 2 at a pH between about 1 and 2.5; in other embodiments the molecular weight is measured for Polymer 2 at a pH between about 2.5 and 6, wherein sodium counterions are present; in still other embodiments the molecular weight is measured for Polymer 2 at a pH of greater than 6, wherein sodium counterions are present.

Polymer 3: copolymers of ethylene glycol (EG) and propylene glycol (PG). Such polymers are assigned CAS No. 9003-11-6. In embodiments, Polymer 3 comprises, consists essentially of, or consists of a block copolymer having at least one EG block and one PG block. In embodiments, Polymer 3 comprises, consists essentially of, or consists of a block copolymer having at least two EG blocks and one PG block. In embodiments, Polymer 3 comprises, consists essentially of, or consists of a block copolymer having two EG blocks and one PG block. In embodiments, Polymer 3 comprises, consists essentially of, or consists of a block copolymer having at least two EG blocks and two PG blocks. In embodiments, the mole ratio of EG:PG in Polymer 3 is about 10:90 to 50:50, for example about 15:85 to 50:50, or about 20:80 to 50:50, or about 25:75 to 50:50, or about 30:70 to 50:50, or about 35:65 to 50:50, or about 40:60 to 50:50, or about 45:55 to 50:50, or about 10:90 to 45:55, or about 10:90 to 40:60, or about 10:90 to 35:65, or about 10:90 to 30:70, or about 10:90 to 25:75, or about 10:90 to 20:80, or about 10:90 to 15:85, or about 20:80 to 40:60, or about 25:75 to 40:60, or about 25:75 to 35:65. In embodiments, the molecular weight of Polymer 3 is about 1000 g/mol to 10,000 g/mol, for example about 2000 g/mol to 10,000 g/mol, or about 3000 g/mol to 10,000 g/mol, or about 4000 g/mol to 10,000 g/mol, or about 1000 g/mol to 9000 g/mol, or about 1000 g/mol to 8000 g/mol, or about 1000 g/mol to 7000 g/mol, or about 1000 g/mol to 6000 g/mol, or about 1000 g/mol to 5000 g/mol, or about 1000 g/mol to 4000 g/mol, or about 2000 g/mol to 8000 g/mol, or about 3000 g/mol to 7000 g/mol, or about 3000 g/mol to 6000 g/mol. Examples of useful antifouling polymers of Polymer 3 type are shown in Table 1.

TABLE 1

Useful antifouling polymers of Polymer 3 type.

| Material | Block copolymer type | (PEO)x, x = | (PPO)y, y = | MW (g/mol) | HLB (product info) |
|---|---|---|---|---|---|
| PLURONIC ® 17R4 (BASF ®, Ludwigshafen, Germany) | PPO-PEO-PPO | 24 | 28 | 2650 | 7-12 |

TABLE 1-continued

Useful antifouling polymers of Polymer 3 type.

| Material | Block copolymer type | (PEO)x, x = | (PPO)y, y = | MW (g/mol) | HLB (product info) |
|---|---|---|---|---|---|
| PLURONIC ® P-123 (BASF ®) | PEO-PPO-PEO | 20 | 70 | 5750 | 7-12 |
| PLURONIC ® F-68 (BASF ®) | PEO-PPO-PEO | 75 | 30 | 8350 | >24 |
| SYNPERONIC ® PE P105 (Croda Int'l Plc, E. Yorkshire, UK) | PEO-PPO-PEO | 37 | 56 | 6500 | 18-23 |
| SYNPERONIC ® PE-P84 (Croda) | PEO-PPO-PEO | | | 4200 | 12-18 |
| TETRONIC ® 90R4 (BASF ®) | Ethylene-diamine tetrakis (PEO-b-PPO) tetrol | | | 6900 | 1-7 |

Method of Reducing Fouling

According to the methods of the invention, an effective amount of one or more antifouling polymers as described above are applied to a water recycling loop of an industrial processing system. The antifouling polymers are usefully added to the water recycling loop at any location within the loop, as will be appreciated by those of skill. However, in some embodiments the one or more antifouling polymers are advantageously added to the process water stripper (PWS), downstream of the quench water tower (QWT) of a pyrolysis plant, where pyrolysis byproducts are initially condensed upon contacting the hot pyrolysis gases with the quench water and further downstream from the quench water separator (QWS) that provides bulk separation of oil and water phases. It is well known by those of skill that the QWS does not completely resolve the phases, and that pyrolysis byproducts and pygas byproducts remain entrained within the water phase as dispersed or emulsified. Thus, the water phase having entrained pyrolysis byproducts and pygas byproducts is applied to the PWS. We have found that adding the one or more antifouling polymers in the PWS reduces or prevents fouling of the surfaces subsequently contacted by the water carrying the pyrolysis byproducts and pygas byproducts along the water recycling loop of the pyrolysis plant.

In some embodiments, an aqueous solution or dispersion of the antifouling polymers is formed initially, then the solution or dispersion is applied to process water present within a device disposed in fluid connection within the water recycling loop. Since the antifouling polymers are fully water soluble or dispersible, such solutions are easily made and applied to the device by mixing with the process water present in the device. Thus in some embodiments, an aqueous solution or dispersion of the one or more antifouling polymers is formed as a concentrate, wherein a targeted amount of the concentrate is applied to the water recycling loop to reach a final target concentration of polymer. The concentration of the one or more antifouling polymers in a concentrate is, for example, about 1 wt % to 70 wt % total weight of polymer based on the weight of the concentrate, or about 1 wt % to 60 wt %, or about 1 wt % to 50 wt %, or about 5 wt % to 70 wt %, or about 10 wt % to 70 wt %, or about 15 wt % to 70 wt %, or about 20 wt % to 70 wt %, or about 10 wt % to 60 wt %, or about 15 wt % to 50 wt % of the one or more antifouling polymers in a concentrate.

One or more additional components are optionally added to the concentrate or otherwise along with the one or more antifouling polymers applied to the water recycling loop. The one or more additional components include water soluble or miscible solvents such as $C_1$-$C_6$ alcohols, glycerol, $C_1$-$C_8$ glycols such as ethylene glycol, propylene glycol, diethylene glycol, and triethylene glycol, ethers of such glycols such as diethylene glycol monobutyl ether, $C_1$-$C_4$ ketones and aldehydes, and the like; and mixtures of two or more thereof. The concentration of one or more solvents in a solution of the one or more antifouling polymers is not particularly limited except as to the limitations of polymer solubility or dispersion stability. In some embodiments, the concentration of one or more solvents in a solution (including concentrates) of the one or more antifouling polymers is about 10 wt % to 50 wt %, for example about 20 wt % to 50 wt %, or about 30 wt % to 50 wt %, or about 10 wt % to 40 wt %, or about 10 wt % to 30 wt %, or about 20 wt % to 40 wt %, or about 30 wt % to 40 wt %.

In some embodiments, the antifouling polymer or an aqueous solution or dispersion thereof is advantageously applied to the PWS. In such embodiments, the concentration of the antifouling polymer in the process water is determined by measuring an average weight of materials present in the quench water tower, and adding a selected amount of the antifouling polymer or an aqueous solution or dispersion thereof to the quench water tower to form a treated process water therein. It is not necessary to add the antifouling polymer or an aqueous solution or dispersion thereof to the quench water tower; the antifouling polymer or an aqueous solution or dispersion thereof is easily added at any point within the water recycling loop to provide antifouling properties to the treated process water formed therein.

The antifouling polymers or aqueous solutions or dispersions thereof are advantageously added to a water recycling loop to target about 1 ppm to 1000 ppm, or about 5 ppm to 500 ppm based on the mass flow applied to the dilution steam generator, or about 10 ppm to 500 ppm, or about 20 ppm to 500 ppm, or about 30 ppm to 500 ppm, or about 40 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 5 ppm to 450 ppm, or about 5 ppm to 400 ppm, or about 5 ppm to 350 ppm, or about 5 ppm to 300 ppm, or about 5 ppm to 250 ppm, or about 5 ppm to 200 ppm, or about 5 ppm to 150 ppm, or about 5 ppm to 100 ppm, or about 10 ppm to 300 ppm, or about 10 ppm to 250 ppm, or about 50 ppm to 250 ppm, or about 50 ppm to 200 ppm, or about 100 ppm to 200 ppm based on the mass flow applied to the dilution steam generator. In some embodiments, the antifouling polymer is added to the water recycling loop downstream from one or more coalescing units.

Applying the antifouling polymer or an aqueous solution or dispersion thereof to the water recycling loop is easily carried out using techniques familiar to those of ordinary skill in the art. Thus, the antifouling polymer is easily added in solid form to an opening in the water recycling loop, or as a preformed concentrate solution or dispersion that is sprayed, dripped, or poured into an opening within the water recycling loop. While not limited thereto, it is generally preferred for ease of use to employ the antifouling polymers as a solution or dispersion thereof. This is due to both ease of applying the solution or dispersion to a water recycling loop, and provision of a pre-hydrated antifouling polymer to the system, whereby the user of ordinary skill is assured that additional fouling or precipitation will not be nucleated by the application of a solid polymer to the water recycling loop.

The presence of the one or more antifouling polymers within the process water of a water recycling loop of an ethylene plant reduces or prevents the fouling of surfaces contacting process water within the water recycling loop. Thus, in some embodiments, a method of treating a process water includes applying to the process water present in an ethylene production plant one or more antifouling polymers or an aqueous solution or dispersion thereof, to form a treated process water. The treated process water proceeds downstream from the location of the applying within the water recycling loop. In some embodiments, the treated process water collected downstream in the water recycling loop from the location of the applying includes an amount of dispersed pyrolysis byproducts and/or pygas byproducts that is greater than the amount of dispersed pygas and/or pygas byproducts in process water collected downstream from the location when no antifouling polymer is applied.

The dispersed components of the treated process water include pygas as well as pygas byproducts, as those terms are defined herein. In some embodiments, the treated process water is collected for further use, such as recycling in the water recycling loop of an ethylene production plant. In some embodiments, the treated process water includes about 0.001 wt % to 200 wt % more dispersed pygas and/or pygas byproducts, when measured downstream from a location where the antifouling polymer is applied to the water recycling loop than the amount of dispersed pygas and/or pygas byproducts in process water collected downstream from the same location when no antifouling polymer is applied, for example about 0.01 wt % to 200 wt %, or about 0.1 wt % to 200 wt %, or about 1 wt % to 200 wt %, or about 5 wt % to 200 wt %, or about 10 wt % to 200 wt %, or about 20 wt % to 200 wt %, or about 30 wt % to 200 wt %, or about 40 wt % to 200 wt %, or about 50 wt % to 200 wt %, or about 60 wt % to 200 wt %, or about 70 wt % to 200 wt %, or about 80 wt % to 200 wt %, or about 90 wt % to 200 wt %, or about 100 wt % to 200 wt %, or about 0.001 wt % to 150 wt %, or about 0.001 wt % to 100 wt %, or about 0.001 wt % to 50 wt %, or about 0.001 wt % to 25 wt %, or about 0.001 wt % to 10 wt %, or about 0.001 wt % to 1 wt % more dispersed pygas and/or pygas byproducts than the amount of dispersed pygas and/or pygas byproducts in process water collected from the location when no antifouling polymer is applied.

After the applying of the antifouling polymer to the water recycling loop, treated process water is observed to include more pygas and/or pygas byproducts than process water obtained without addition of the antifouling polymer. Stated differently, less fouling of equipment by precipitation of pygas and/or pygas byproducts is observed in the treated process water than in process water without addition of the antifouling polymer. Fouling in the water recycling loop is evidenced by operational change of pressure (ΔP) in the PWS, and/or heat transfer loss on the DSG reboiler, which necessitates higher heat flow from the heating source or results in a reduced production of dilution steam as fouling occurs.

A useful technique to monitor fouling is to suspend a tared metal piece within the water recycling loop, wherein the weight of fouling (materials deposited on the plate) is advantageously measured on-demand by removing the piece(s) and weighing them. Equipment designed for quantitative analysis of fouling is also useful for such measurements. For example, a useful process water fouling simulator (PWFS) contains a glass vessel including de-mineralized water and a tared carbon steel metal coupon. The coupon is immersed in the water so that the edges of the coupon do not touch the glass. The contents of the vessel are heated to e.g. 80° C. to 110° C., then an antifouling polymer is applied to the vessel in a selected amount. Then styrene and an initiator (a compound known to initiate radical polymerization at temperatures of about 50° C. and higher) are added to the vessel. The mixture is stirred for one hour, then the coupon is removed from the vessel. The coupon is dried and weighed. In this manner, the amount of pygas/pygas byproducts deposited on the coupon—that is, the amount of fouling—is determined by the mass of the coupon relative to the initial mass of the coupon. The reduction of fouling is determined by differentiating between the mass of the coupon obtained after using the antifouling polymer, and the mass of the coupon obtained after no antifouling polymer is used. Using such measurements, fouling by pygas and/or pygas byproducts is reduced by at least about 50 wt % compared to pygas or pytar fouling without the antifouling polymers, for example about 50 wt % to 100 wt % (where 100 wt % reduction in fouling is elimination of fouling), or about 50 wt % to 95 wt %, or about 50 wt % to 90 wt %, or about 50 wt % to 85 wt %, or about 50 wt % to 80 wt %, or about 50 wt % to 75 wt %, or about 50 wt % to 70 wt %, or about 55 wt % to 100 wt %, or about 60 wt % to 100 wt %, or about 65 wt % to 100 wt %, or about 70 wt % to 100 wt %, or about 60 wt % to 95 wt %, or about 70 wt % to 95 wt %, or about 60 wt % to 90 wt %, or about 70 wt % to 90 wt %.

In some embodiments, the amount of fouling is determined by turbidity measurements. Using such measurements, normalized turbidity of the treated water is increased about 5× (5 times) to 10×, or about 6× to 10×, or about 7× to 10×, or about 8× to 10×, or about 9× to 10×, or about 5× to 9×, or about 5× to 8×.

The relative ratio of the three antifouling polymers when applied as a blend to a water recycling loop is not particularly limited. The weight ratio of Polymer 1: Polymer 2: Polymer 3 applied to the water recycling loop ranges from 0:0:1 to 0:1:0 to 1:0:0 and all ratios therebetween without limitation. In representative embodiments, useful ratios include 0.25:0.75:0, or 0.125:0.75:0.125. Thus, one, two, or all three of the antifouling polymers are usefully employed at different ratios in order to address various pyrolysis byproducts and pygas byproducts within various pyrolysis plants.

In some embodiments, mixtures of Polymer 1 and Polymer 2 are applied to a water recycling loop, wherein the mixture of Polymer 1 and Polymer 2 results in a less fouling than can be obtained in process water treated using the same total weight of either Polymer 1 or Polymer 2 alone. In such embodiments, the weight ratio of Polymer 1: Polymer 2 applied to a water recycling loop ranges from about 90:10 to 5:95, for example about 80:20 to 5:95, or about 70:30 to 5:95, or about 60:40 to 5:95, or about 50:50 to 5:95, or about 90:10 to 10:90, or about 90:10 to 20:80, or about 90:10 to 30:70, or about 90:10 to 40:60, or about 90:10 to 50:50. In such embodiments, any weight ratio of Polymer 1: Polymer 2 within the stated range of ratios provides a greater amount of dispersed components—that is, less fouling—in the treated process water than can be obtained in process water treated using the same total weight of either Polymer 1 or Polymer 2 alone.

In some embodiments, mixtures of Polymer 1 and Polymer 3 are applied to a water recycling loop of an ethylene manufacturing plant, wherein the mixture of Polymer 1 and Polymer 3 results in a less fouling than can be obtained in process water treated using the same total weight of either Polymer 1 or Polymer 3 alone. In such embodiments, the weight ratio of Polymer 1: Polymer 3 ratio ranges from about 90:10 to 10:90. In such embodiments, any weight ratio of Polymer 1: Polymer 3 within the stated range of ratios provides a greater amount of dispersed components in the treated process water than can be obtained in process water treated using the same total weight of either Polymer 1 or Polymer 3 alone.

In some embodiments, mixtures of Polymer 2 and Polymer 3 are applied to a water recycling loop of an ethylene manufacturing plant, wherein the mixture of Polymer 2 and Polymer 3 results in a less fouling than can be obtained in process water treated using the same total weight of either Polymer 2 or Polymer 3 alone. In such embodiments, the weight ratio of Polymer 2: Polymer 3 ratio ranges from about 90:10 to 10:90. In such embodiments, any weight ratio of Polymer 2: Polymer 3 within the stated range of ratios provides a greater amount of dispersed components in the treated process water than can be obtained in process water treated using the same total weight of either Polymer 2 or Polymer 3 alone.

An antifouling polymer solution or dispersion is applied to the water recycling loop at a point downstream from the coalescer, or downstream from the QWS, for example between the QWS and the PWS, or at the PWS, using any one or more of several methods familiar to those of skill and/or as further discussed above. In some embodiments an antifouling polymer solution or dispersion is applied to the water recycling loop downstream from the coalescer unit, for example using a separate inlet near the base thereof or as a spray near the top portion of one or more thereof so as to apply the antifouling polymer solution or dispersion after an initial separation of pygas and/or pygas byproducts from the process water. In some embodiments, the antifouling polymer solution or dispersion is applied to the water recycling loop after the process water enters the PWS. In some embodiments, the antifouling polymer solution or dispersion is added to the water phase after bulk separation in a primary oil/water separation unit (QWS). In some embodiments, the antifouling polymer solution or dispersion is applied batchwise to the water recycling loop. In some embodiments, the antifouling polymer solution or dispersion is applied continuously to the water recycling loop. In some embodiments, the application of the antifouling polymer solution or dispersion is manual; in other embodiments, the application is automated.

In some embodiments, the treated process water includes about 1% to 25% higher total organic carbon content than a process water wherein no antifouling polymers were added to the emulsion. In some embodiments, a treated process water includes about 1% to 20% higher total organic carbon content than process water collected from a resolved emulsion wherein no antifouling polymers were added to the process water, or about 1% to 15% higher, or about 1% to 10% higher, or about 1% to 8% higher, or about 1% to 6% higher, or about 2% to 25% higher, or about 5% to 25% higher, or about 10% to 25% higher total organic carbon content than process water collected from a resolved emulsion wherein no antifouling polymers were added to the process water.

The application of one or more antifouling polymers to a process water, even at process water temperatures of about 60° C. to 110° C., or about 70° C. to 110° C., or about 80° C. to 110° C., or about 60° C. to 100° C., or about 60° C. to 90° C. does not lead to foaming, viscosification, or fouling of equipment within the water recycling loop. That is, the combination of process water and the one or more antifouling polymers—the treated process water—does not lead to observable foaming or viscosification in the water recycling loop, and fouling is also reduced or eliminated in the treated process water when compared to untreated process water.

In embodiments, the methods of the invention include allowing a period of time to elapse between applying the one or more antifouling polymers to the water recycling loop, for example downstream from one or more coalescer units, and collecting a treated process water therefrom for quantification of reduction or elimination of fouling. Such a period of time is provided to allow the pygas and/or pygas byproducts to become dispersed in the presence of the one or more antifouling polymers. In other words, the efficacy of the antifouling polymers is measured at some point in time after application thereof in order to measure the amount of fouling occurring subsequently in the water recycling loop. Fouling is measured as either a relative increase in retention of solids within the treated process water compared to the retention of solids in untreated process water over the same time period; or as increased turbidity of the treated process water relative to untreated process water over the same time period (indicating higher carbon content in the water); or as decreased deposition of solids on process equipment contacted with the treated process water compared to deposition of solids on process equipment contacted with the untreated process water over the same time period.

In some such embodiments, the period of time between forming a treated process water and an observed increase in retention of solids within the treated process water or an increase in turbidity of the treated process water for treatment of incoming foulant (that is, foulant that is generated substantially contemporaneously with formation of treated process water) is about 10 seconds (s) to about 60 minutes (min), for example about 20 s to 60 min, or about 30 s to 60 min, or about 40 s to 60 min, or about 50 s to 60 min, or about 1 min to 60 min, or about 5 min to 60 min, or about 10 min to 60 min, or about 20 min to 60 min, or about 30 min to 60 min, or about 40 min to 60 min, or about 10 s to 55 min, or about 10 s to 50 min, or about 10 s to 45 min, or about 10 s to 40 min, or about 10 s to 30 min, or about 5 min to 45 min, or about 10 min to 45 min, or about 10 min to 30 min, or about 15 min to 45 min, or about 15 min to 30 min, or about 20 min to 45 min, or about 20 min to 30 min. In other embodiments, the period of time between forming a treated process water and measurement of solids or turbidity is longer than the above stated ranges because the treatment is applied to systems wherein foulant was previously deposited. Thus, for example, foulant deposited prior to forming the treated process water may take several hours, several days, or even several weeks for treatment of deposits that have formed over extended duration prior to forming the treated process water. The longer the period of fouling prior to forming the treated process water, the longer the period of time between forming a treated process water and the observed increase in retention of solids within the treated process water or an increase in turbidity of the treated process water.

EXPERIMENTAL

The following examples are intended to show experimental embodiments of the invention. The embodiments are not limiting to the scope of the claims appended hereto. It will be recognized that various modifications and changes may be made without following the experimental embodiments described herein, further without departing from the scope of the claims.

Example 1

Solutions of the materials of Table 2, including Polymer 1, in the amounts given in Table 2, were made in de-ionized water at a pH that ranged from 6 to 10. Ten milliliters of each solution individually were placed in a test tube, and all the test tubes were placed together in an 80° C. water bath until the solutions equilibrated at the temperature of the water bath. After equilibration, a pygas byproduct as defined in section [021], was added in solution to the each test tube in the same amount, varying from 0.1 mL to 0.5 mL in volume. The test tubes were then agitated either mechanically or by hand to thoroughly mix the test tube contents. The test tubes were allowed to rest, undisturbed, in a vertical position on a benchtop. They were inspected immediately after mixing and subsequently at 15 minute intervals as they cooled to room temperature. The appearance of the mixtures in each test tube was rated, typically after a total of 60 minutes, by a visual scale wherein a rating of "1" indicates a completely transparent mixture and "5" indicates a completely opaque mixture. All samples were held against a white background for the rating. A higher rating—that is, higher opacity—indicates more dispersed materials are present in the process water mixture and thus reduced or eliminated fouling. Table 2 provides the ratings assigned to the process water mixtures.

TABLE 2

Materials added to process water, and resulting transparency ratings.

| Material added to process water | Amount, ppm | Rating |
|---|---|---|
| Untreated | N/A | 1 |
| Polypropylene glycol/polyethylene glycol dioleate in naphthenic oil | 1000 | 1 |
| Polyisobutylene succinate ester of pentaerythritol in aromatic naphtha | 1000 | 1 |
| Copolymer of tall oil fatty acid (TOFA), diethylene triamine (DETA) and acrylic acid (AA) at a molar ratio of 2.1:1.0:1.1 TOFA:DETA:AA. | 1000 | 4 |
| Ethoxylated sorbitan fatty acid ester in petroleum distillate | 1000 | 1 |

Example 2

Example 1 was repeated except employing a Polymer 2 material, which is a copolymer of acrylamide (AM) and methacrylamidopropyl trimethylammonium chloride (MAPTAC) at a molar ratio of 39:1 AM:MAPTAC. Results are shown in Table 3.

TABLE 3

Materials added to process water, and resulting transparency ratings.

| Material added to process water | Amount, ppm | Rating |
|---|---|---|
| Untreated | N/A | 1 |
| Sodium dodecylsulfate | 1000 | 1 |
| AMRESCO ® Nonidet P40 Substitute (AMRESCO ® LLC, Solon, OH) | 1000 | 1 |
| Sodium dioctylsulfosuccinate | 1000 | 1 |
| Copolymer of acrylamide (AM) and methacrylamidopropyl trimethylammonium chloride (MAPTAC) at a molar ratio of 39:1 AM:MAPTAC | 1000 | 3 |

Example 3

Example 1 was repeated except employing a Polymer 3 type polymer, a PEO-PPO-PEO triblock copolymer having a reported molecular weight of 4200. Results are shown in Table 4.

TABLE 4

Materials added to process water, and resulting transparency ratings.

| Material added to process water | Amount, ppm | Rating |
|---|---|---|
| Untreated | N/A | 2 |
| Copolymer of tall oil fatty acid (TOFA), diethylene triamine (DETA) and acrylic acid (AA) at a molar ratio of 2.1:1.0:1.1 TOFA:DETA:AA | 1000 | 2 |
| Poly(sodium 4-styrenesulfonate) | 1000 | 1 |
| Ethoxylated nonylphenol-benzaldehyde copolymer in aromatic naphtha | 1000 | 2 |
| Copolymer of acrylamide (AM) and methacrylamidopropyl trimethylammonium chloride (MAPTAC) at a molar ratio of 39:1 AM:MAPTAC. | 1000 | 2 |
| Ethoxylated fatty alcohol phosphate ester | 1000 | 1 |
| PEO-PPO-PEO block copolymer, MW 4200 | 1000 | 4 |

Examples 4-9

A process water simulation of styrene fouling was carried out. A 500 mL glass round bottom flask was filled with 400 mL of de-mineralized water to which NaCl and monoethanolamine were added in an amount sufficient to provide a pH of 9-9.5 and a conductivity of ca. 215 µS/cm. A tared carbon steel metal coupon (dimensions: 30 mm×15 mm×2 mm, weighing approximately 7 g) was immersed in the water so that the edges of the coupon did not touch the glass. The contents of the vessel were purged with nitrogen for about 20 minutes, then 110 ppm of an antifouling polymer or mixture thereof was added to the vessel. The vessel was immersed in a 100° C. oil bath and the temperature of the flask contents were allowed to reach a constant temperature. Then 8 mL of de-inhibited styrene including 7000 ppm of azobisisobutyronitrile (AIBN) was added to the vessel via a syringe at a rate of 60 mL/h.

After styrene addition was complete, the contents of the flask were stirred for 1 additional hour, then the coupon and a sample of the flask contents was removed from the vessel. The coupon was dried overnight at 35° C. under vacuum, and weighed. The flask content sample was allowed to cool to ambient laboratory temperature and was then analyzed using a EUTECH TN-100 turbidimeter (obtained from Thermo Fisher Scientific of Waltham, Mass.).

The procedure was repeated with various antifouling polymers and blends thereof; a control example was also generated wherein no antifouling polymer was added to the flask. Each test was carried out in duplicate and results averaged; the control example with no antifouling polymer was carried out in triplicate. Table 5 shows the type and amount of one or more antifouling polymers added directly to the flask in the experiments (that is, the polymers were added as-is and not as a solution or dispersion). Polymer 1 is a copolymer of tall oil fatty acid (TOFA), diethylene triamine (DETA) and acrylic acid (AA) at a molar ratio of 2.1:1.0:1.1 (TOFA:DETA:AA). Polymer 2 is a copolymer of acrylamide (AM) and methacrylamidopropyl trimethylammonium chloride (MAPTAC) at a molar ratio of 39:1 AM:MAPTAC.

TABLE 5

Type and amount of antifouling polymers employed in the indicated examples.

| Example No. | Polymer 1:Polymer 2, wt:wt, 110 ppm total |
|---|---|
| 4 | 100:0 |
| 5 | 75:25 |
| 6 | 50:50 |
| 7 | 25:75 |
| 8 | 0:100 |
| 9C | No polymer (control) |

FIG. 1 graphically summarizes the mass of material formed on the coupons as well as the turbidity for each antifouling polymer or combination thereof as well as the control example (no antifouling polymer added). Both Polymer 1 and Polymer 2 cause a significant decrease in the mass of material deposited on the coupon compared to the control, indicating effective reduction of fouling potential in an actual water recycling loop of a pyrolysis plant. Use of a combination of Polymer 1 and Polymer 2 reveal that at ratios of 25:75 and 50:50 Polymer 1: Polymer 2 the mass deposited on the coupon is even more reduced compared to the use of either polymer alone. The turbidity measurements show that decreased deposition on the coupon correlates to increased water turbidity, again indicating that the antifouling polymers are highly effective at preventing or reducing fouling of surfaces exposed to process waters containing pygas and pygas byproducts.

Example 10

The process of Example 1 was repeated except for the following differences. Freshly obtained process water was decanted from the remaining petroleum byproducts in the sample. Then 2 mL of pytars that settled at the bottom of the decanted water phase was added to each of five 40 mL vials. Then 20 mL of demineralized water was added to each of the vials, and the vials were manually shaken 50 times. Next, 50 ppm of a material indicated in Table 5 was added to a vial, and the vials were shaken an additional 50 times. Then the vials were placed in an 80° C. water bath for 3 hours. After cooling to ambient laboratory temperature, the vials were shaken an additional 50 times; then the rating system described in Example 1 was applied at least 1 minute after the final shaking. Table 6 shows the ranking assigned to the vials as a function of type of dispersant.

TABLE 6

Materials used and ratings for Examples 10 and 11.

| | Rating | |
|---|---|---|
| Material added to process water @ 50 ppm | Ex. 10 | Ex. 11 |
| SYNPERONIC ® PE/P84 (Croda International Plc, E. Yorkshire, UK | 5 | 5 |
| Copolymer of acrylamide (AM) and methacrylamidopropyl trimethylammonium chloride (MAPTAC) at a molar ratio of 39:1 AM:MAPTAC | 3 | n.a. |
| Copolymer of tall oil fatty acid (TOFA), diethylene triamine (DETA) and acrylic acid (AA) at a molar ratio of 2.1:1.0:1.1 (TOFA:DETA:AA) | 3 | n.a. |
| Ethoxylated fatty alcohol phosphate ester | 3 | 4 |
| Poly(sodium 4-styrenesulfonate) (Sigma Aldrich, Milwaukee, WI) | 3 | 4 |

Example 11

Five 40 ml vials were filled with freshly obtained process water, which was the same process water as used in Example 10. Decanting the liquid phase resulted in residual materials visibly adhered to the vial walls. To these emptied vials, 20 ml of demineralized water was added. Then, 50 ppm of a material as indicated in Table 5 was added and the vial was manually shaken 50 times. Then the vials were placed in an 80° C. water bath for 3 hours. After cooling to ambient laboratory temperature, the vials were shaken an additional 50 times; then the rating system described in Example 1 was used to analyze the contents of the vials at least one minute after the final shaking. Results are shown in Table 6.

Example 12

The procedure of Examples 4-9 was repeated, except that the oil bath temperature was set to 110° C. and concentration of the materials used was $10^{-4}$ mol/L. Materials used were of the Polymer 3 type: PLURONIC® 17R4, P-123, and F-68, and TETRONIC® 90R4 (all obtained from BASF® SE of Ludwigshafen, Germany), and SYNPERONIC® PE P105 and PE-P84 (both obtained from Croda International Plc of East Yorkshire, UK).

Figure 2:
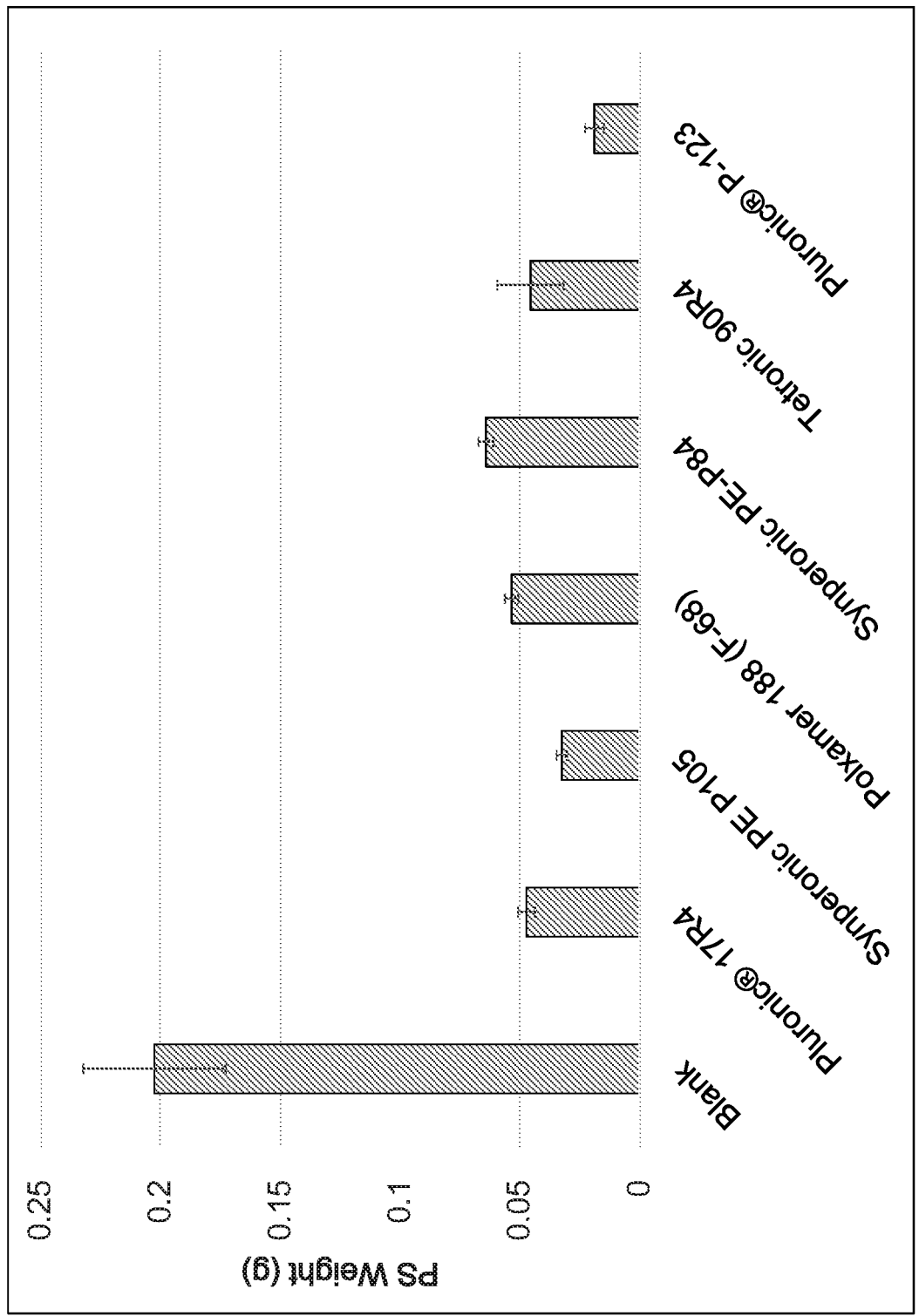
FIG. 2 is a plot showing mass of polystyrene deposition for Example 12.

FIG. 2 graphically summarizes the mass of material formed on the coupons for each of the antifouling polymers as well as the control example (no antifouling polymer added). The results show that the Polymer 3 type antifouling polymers are useful to reduce or prevent fouling due to both pytar (see Ex. 11-12) and styrene polymerization.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A method of reducing fouling in a water recycling loop of an industrial process comprising process water containing pygas or pygas byproducts, the method comprising:
   applying a total of about 5 ppm to 500 ppm of one or more antifouling polymers to the process water to form a treated process water, wherein the one or more antifouling polymers comprises a blend of a first polymer selected from copolymers of unsaturated fatty acids, primary diamines, and acrylic acid and a second polymer selected from copolymers of methacrylamidopropyl trimethylammonium chloride with acrylic acid and/or acrylamide; and
   contacting the treated process water with an interior surface within the water recycling loop.

2. The method of claim 1 wherein the method comprises applying about 10 ppm to 250 ppm of the one or more antifouling polymers.

3. The method of claim 1 wherein the second polymer is selected from copolymers of methacrylamidopropyl trimethylammonium chloride with acrylamide.

4. The method of claim 3 wherein the one or more antifouling polymers are applied at a ratio of about 25:75 to 75:25 by weight of the copolymer of unsaturated fatty acids, primary diamines, and acrylic acid to the copolymer of methacrylamidopropyl trimethylammonium chloride with acrylamide.

5. The method of claim 4 wherein the method comprises applying a total of about 100 ppm to 200 ppm of the one or more antifouling polymers to the process water.

6. The method of claim 1 wherein the unsaturated fatty acids consist essentially of tall oil fatty acids.

7. The method of claim 6 wherein the copolymers of tall oil fatty acids, primary diamines, and acrylic acid comprise at least about 50 wt % tall oil fatty acids.

8. The method of claim 1 wherein the primary diamines consist essentially of diethylene triamine.

9. The method of claim 1 wherein the treated process water includes about 25 wt % to 200 wt % more dispersed pygas and/or pygas byproducts than the process water.

10. The method of claim 1 wherein the treated process water includes about 1 wt % to 150 wt % more dispersed pygas and/or pygas byproducts than the process water.

11. The method of claim 1 wherein the first polymer comprises a polymer having 50 wt % to 90 wt % tall oil fatty acid content, 5 wt % to 40 wt % diethylenetriamine content, and 5 wt % to 35 wt % acrylic acid content based on the weight of the polymer.

12. The method of claim 1 wherein the applying is downstream from a coalescer in a pyrolysis plant.

13. The method of claim 1 wherein the applying is carried out continuously.

14. The method of claim 1, wherein the process water is present at a temperature of about 60° C. to 110° C.

15. The method of claim 1 wherein the process water comprises pygas byproducts.

16. The method of claim 1, wherein the water recycling loop comprises one or more quench water towers, oil/water separators, process water strippers, dilution steam generators, or combination thereof in fluid connection.

17. The method of claim 1, wherein the water recycling loop comprises a dilution steam system.

18. The method of claim 1, wherein the industrial process comprises a pyrolysis process.

19. A method of reducing fouling in a water recycling loop of an industrial process comprising process water containing pygas or pygas byproducts, the method comprising:
   applying a total of about 5 ppm to 500 ppm of one or more antifouling polymers to the process water to form a treated process water, wherein the one or more antifouling polymers comprises one or more copolymers of ethylene glycol and propylene glycol; and
   contacting the treated process water with an interior surface within the water recycling loop.

* * * * *